(12) United States Patent
Hanitzsch et al.

(10) Patent No.: US 8,336,668 B2
(45) Date of Patent: Dec. 25, 2012

(54) FLANGED JOINT

(75) Inventors: Robert Hanitzsch, Kernen (DE); Arnulf Spieth, Hochdorf (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 403 days.

(21) Appl. No.: 12/641,940

(22) Filed: Dec. 18, 2009

(65) Prior Publication Data

US 2010/0155169 A1 Jun. 24, 2010

(30) Foreign Application Priority Data

Dec. 23, 2008 (DE) .......................... 10 2008 062 917

(51) Int. Cl.
*B60K 13/04* (2006.01)
(52) U.S. Cl. ....................................... 180/309; 180/296
(58) Field of Classification Search ................ 180/309, 180/296, 89.2; 403/337, 28, 30; 285/414, 285/368, 238, 49, 301, 412, 405
See application file for complete search history.

(56) References Cited

U.S. PATENT DOCUMENTS

| | | | | |
|---|---|---|---|---|
| 3,135,538 A | | 6/1964 | George | |
| 4,120,175 A | * | 10/1978 | Dernedde | 285/405 |
| 4,372,587 A | * | 2/1983 | Roche | 285/238 |
| 4,721,315 A | | 1/1988 | Ueta | |
| 4,730,852 A | * | 3/1988 | Arscott | 285/412 |
| 5,524,906 A | * | 6/1996 | Rackov et al. | 285/368 |
| 5,755,466 A | * | 5/1998 | Harth | 285/412 |
| 5,961,153 A | * | 10/1999 | Foster | 180/309 |
| 6,279,965 B1 | * | 8/2001 | Kida | 285/268 |
| 6,361,085 B2 | * | 3/2002 | Nguyen | 285/368 |
| 6,568,715 B2 | * | 5/2003 | Cwik | 285/49 |
| 7,086,832 B2 | | 8/2006 | Lienau et al. | |
| 7,401,821 B2 | * | 7/2008 | Svetlik | 285/414 |
| 7,478,843 B2 | * | 1/2009 | Dole et al. | 285/368 |
| 7,699,556 B2 | * | 4/2010 | Efremov | 403/337 |
| 7,798,532 B2 | * | 9/2010 | Huber | 285/49 |

FOREIGN PATENT DOCUMENTS

DE 16 50 070 B1 7/1970
EP 1 420 166 A1 5/2004

* cited by examiner

*Primary Examiner* — Hau Phan
(74) *Attorney, Agent, or Firm* — McGlew and Tuttle, P.C.

(57) ABSTRACT

A flanged joint (1) of an exhaust system of an internal combustion engine, especially of a motor vehicle, is provided for fastening a tubular body (4) of the exhaust system to another component (5). The flanged joint includes a tube bell (2) formed at the end area of the tubular body (4) as well as a ring-shaped flange (3), which surrounds the tubular body (4) on a side of the tube bell (2) facing away from the other component (5) and which has a plurality of fastening sites (6, 7) for connection to the other component (5).

20 Claims, 4 Drawing Sheets

FLANGED JOINT

CROSS REFERENCE TO RELATED APPLICATIONS

This application claims the benefit of priority under 35 U.S.C. §119 of German Patent Application DE 10 2008 062 917.0 filed Dec. 23, 2008, the entire contents of which are incorporated herein by reference.

FIELD OF THE INVENTION

The present invention pertains to a flanged joint of an exhaust system of an internal combustion engine, especially of a motor vehicle.

BACKGROUND OF THE INVENTION

Flanged joints are used in exhaust systems to fasten a tubular body of the exhaust system to another component, where the other component may be an additional component of the exhaust system or a component of the internal combustion engine. In certain applications, an end area of the tubular body of the exhaust system may have a tube bell, i.e., an end section with flaring cross section. A flanged joint that is suitable for this now has a ring-shaped flange, which surrounds the tubular body on a side of the tube bell facing away from the other component, and said flange has a plurality of passage openings for a screw connection to the other component. Such a flanged joint is present, for example, where the exhaust system is connected to a turbine of an exhaust gas turbocharger. It may now be necessary for reasons dictated by the space available for installation to use a flange, which has only two, mutually diametrically opposite passage openings for the screw connection. It was found that leaks may develop in such flanged joints, so that exhaust gas may escape from the exhaust system in the area of the flanged joint. In addition, relative motions and hence wear may develop because of alternating loads or vibrations.

SUMMARY OF THE INVENTION

The object of the present invention is to propose an improved embodiment, which is characterized especially in that it has increased tightness, for a flanged joint of the type mentioned in the introduction.

According to the invention, a flanged joint of a motor vehicle exhaust system of an internal combustion engine is provided for fastening a tubular body of the exhaust system to another exhaust system component or internal combustion engine component. The flanged joint comprises a tube bell formed at an end area of the tubular body and a ring-shaped flange surrounding the tubular body on a side of the tube bell facing away from the other component. The ring-shaped flange has a plurality of fastening sites for connection to the other component. A surface contour is provided between the flange and the other component. The surface contour is shaped to provide a homogenization of surface pressure between fastening sites in the mounted state.

The present invention is based on the general idea of making at least one surface contour between the flange and the other component not flat, i.e., two-dimensional, but three-dimensional, doing so specifically such that a homogenizing action will become established for the surface pressure between the fastening sites in the mounted state of the flanged joint. The present invention utilizes the discovery that a higher surface pressure is present between two components that are mutually in contact with one another in the area of the respective fastening site in case of comparatively great distances between adjacent fastening sites in case of flat surface contours than between adjacent fastening sites. Due to a shape of the surface contour deviating from a flat surface contour, the surface pressure between adjacent screw sites can be increased, which leads to homogenization of the surface pressure. Improved sealing action develops in the flanged joint in case of a uniform surface pressure in the circumferential direction.

The specially shaped surface contour may be arranged or formed either between the flange and the tube bell or between the tube bell and the other component.

Corresponding to a special embodiment, the surface contour may be shaped such that the flange is elastically deformed in the mounted state, specifically such that the desired homogenizing action is obtained for the surface pressure between the screw sites. This variant utilizes the discovery that the varying surface pressure is brought about in flanged joints with flat contact surfaces predominantly by the fact that the flange undergoes an elastic deformation during the preparation of the connections, e.g., when the screw sites are tightened. Due to the proposed shaping of the surface contour, this deformation can be anticipated quasi inversely, so that the deformation of the flange arising, e.g., during the tightening of the screw connection is compensated, which leads to the desired homogenization of the surface pressure between the fastening sites.

The "homogenization" achieved in the process shall not be construed in absolute terms, but relatively in relation to a conventional flanged joint with flat surface contours. An isobar extending in the contact surface will become established in reality in the form of a closed profile, which isobar may migrate radially within the contour surface in case of a flat flange and also axially in case of a conical flange.

The specially shaped surface contour may be formed at the tube bell and/or at the flange and/or at the other component. As an alternative to this, the surface contour may also be formed at an intermediate ring, which is arranged between the tube bell and the flange. It is possible, in particular, by means of such an intermediate ring to retrofit already existing flanged joints into the flanged joint according to the present invention, i.e., to provide the flanged joint with improved tightness by means of the specially shaped intermediate ring.

The intermediate ring may have, for example, connecting sections, with which it can be integrated into the fastening sites. This simplifies the integration of the intermediate ring into the flanged joint. For example, the connecting sections define a relative position, especially a relative rotation position, between the intermediate ring and the other components of the flanged joint.

It is obvious that the above features, which will also be explained above, can be used not only in the particular combination indicated, but in other combinations or alone as well, without going beyond the scope of the present invention.

Preferred exemplary embodiments of the present invention are shown in the drawings and will be explained in more detail below, and identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
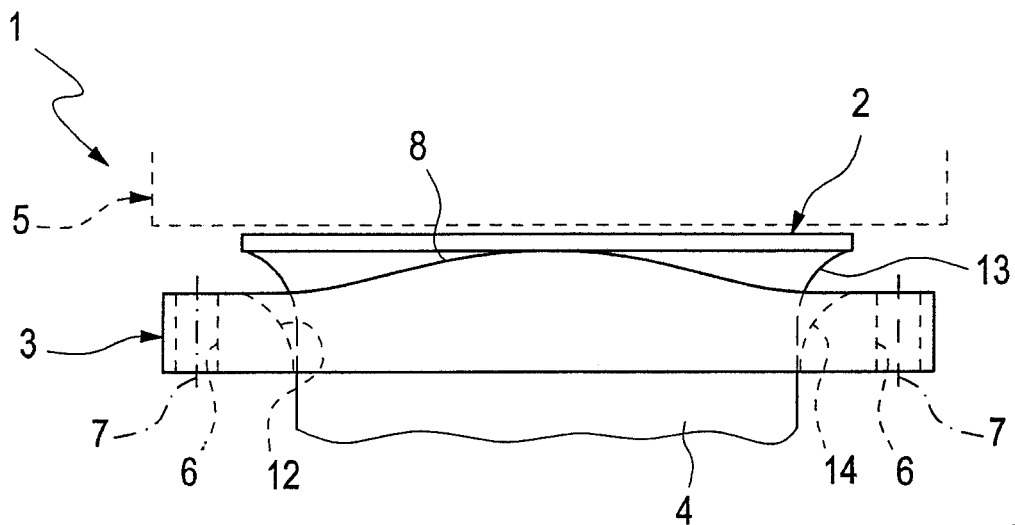
FIG. 1 is a greatly simplified side view of an embodiment of a flanged joint before mounting.
Figure 2:
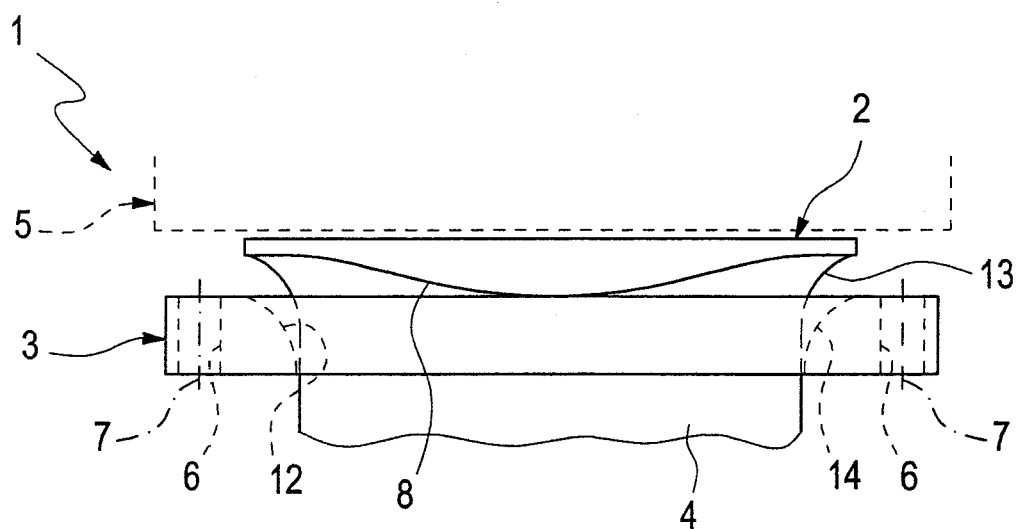
FIG. 2 is a greatly simplified side view of another embodiment of a flanged joint before mounting.
Figure 3:
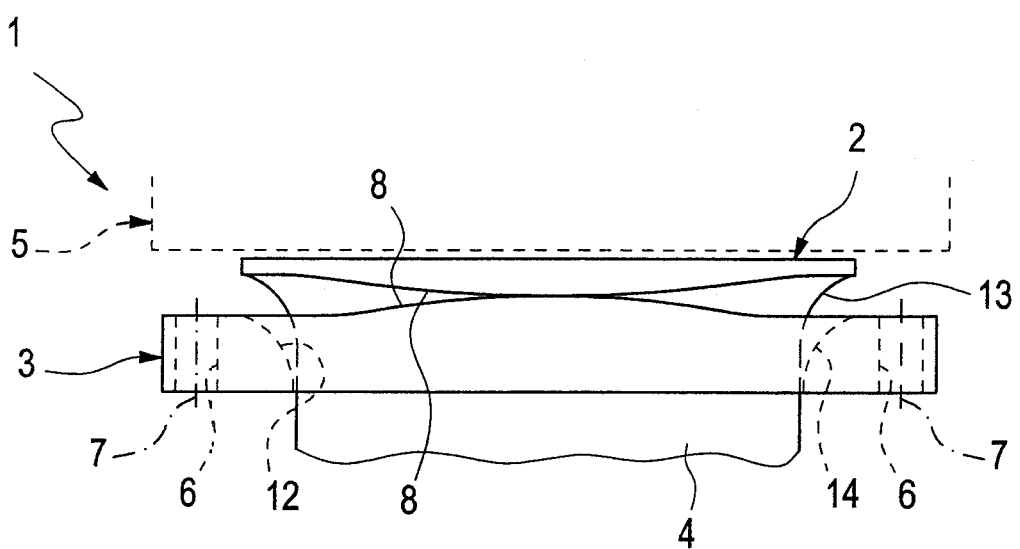
FIG. 3 is a greatly simplified side view of another embodiment of a flanged joint before mounting.
Figure 4:
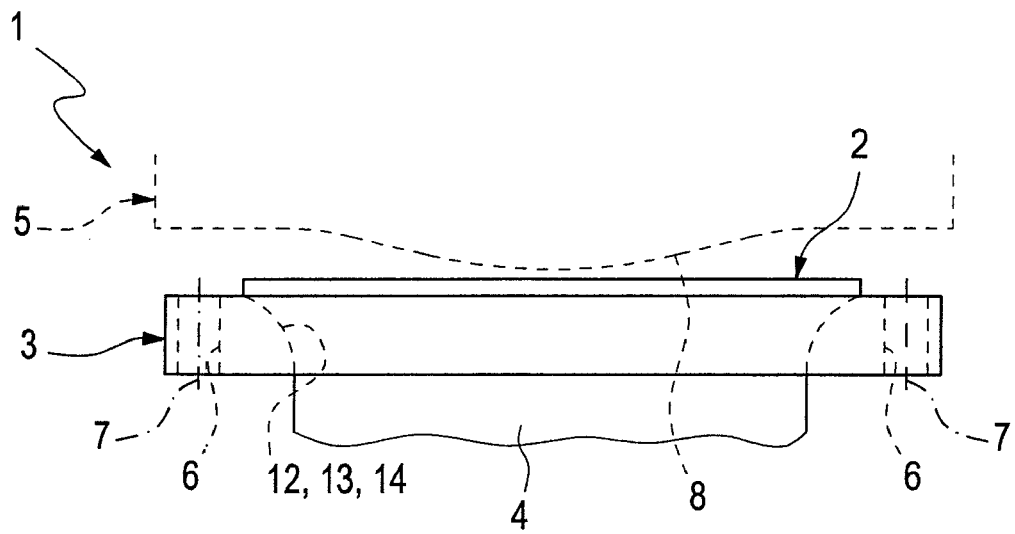
FIG. 4 is a greatly simplified side view of another embodiment of a flanged joint before mounting.

Referring to the drawings in particular, corresponding to FIGS. 1-10, a flanged joint 1, which is a component of an exhaust system of an internal combustion engine, not shown otherwise, comprises a tube bell 2 as well as a ring-shaped flange 3. The flanged joint 1 is used within the exhaust system, which may be arranged together with the corresponding internal combustion engine in a motor vehicle, for example, to fasten a tubular body 4 of the exhaust system to another component 5 of the exhaust system. Component 5 may also be, in principle, any other desired component, for example, a component of the internal combustion engine. The flanged joint 1 is, however, preferably used to connect the tubular body 4 to an exhaust system component 5. However, component 5 is preferably, but without limiting the general character, a turbine of an exhaust gas turbocharger, to which turbine the exhaust system or the tubular body 4 thereof is connected. The tube bell 2 is connected for this to an outlet or to an inlet of the turbine, i.e., of component 5. The tube bell 2 is formed at the end area of the tubular body 4. The term "tube bell" designates here an axial end section of the tubular body 4, which has an expanding inner cross section rounded towards the front-side end of the tubular body 4.

Flange 3 is of a ring-shaped design and is arranged on a side of the tube bell of the tubular body 4, which said side faces away from the other component 5. The flanged joint 1 has at least two fastening sites, which are located at spaced locations from one another and are arranged especially diametrically opposite each other. These fastening sites are formed in the example by passage openings 6 and screw connections 7, i.e., by screw sites 6-7. Flange 3 consequently has in the example a plurality of passage openings 6, through which flange 3 can be screwed to the other component 5. Corresponding screw connections are indicated in the figures by dash-dotted lines and are designated by 7. These screw connections 7 are not yet tightened in the views in FIGS. 1-5 and 7-9. These figures correspondingly show each a not completely mounted state of the flanged joint 1. The screw connections 7 are tightened in the views in FIGS. 6 and 10 only. These figures correspondingly show a completely mounted state of flanged joint 1. It is remarkable that flange 3 tightens the tube bell 2 on the outer edge thereof axially against component 5, and, in particular, an axial gap 15 defined by the wall thickness of the outer edge of the tube bell is formed. Such an axial gap 15 is dispensed with in preferred embodiments by a corresponding shape. In case of optimal contouring, flange 3 is directly in contact with component 5. This is advantageous for mounting, because screwing is possible with torque switch-off. As soon as the particular screwdriver tightens the flanged joint completely, the tightening torque increases rapidly and reaches the particular switch-off torque set.

In the preferred examples shown, the particular flange 3 has exactly two passage openings 6, so that ultimately only exactly two screw connections 7 or exactly two screw sites 7 are provided. The two passage openings 6 are then arranged at the flange 3 diametrically opposite each other. The flanged joint 1 may, in principle, also be embodied with a flange 3 that has more than two passage openings 6. As an alternative, other fastening means are also possible, such as toggle levers or the like.

A surface contour 8, which has a three-dimensional shape deviating from a two-dimensional plane, is formed between flange 3 and the other component 5. The curvature of surface contour 8 is shown in a markedly exaggerated form in all views according to FIGS. 1 through 5 and 7 through 9 for better understanding. Surface contour 8 is shaped such that it brings about homogenization of the surface pressure between the screw sites defined by the passage openings 6 or by the screw connections 7 in the mounted state of the flanged joint 1 corresponding to FIGS. 6 and 10. This surface contour 8 is formed or arranged between flange 3 and the tube bell 2 in the embodiments according to FIGS. 1-3 and 7-9. Contrary to this, surface contour 8 is formed or arranged between the tube bell 2 and the other component 5 in the embodiments according to FIGS. 4 and 5.

Furthermore, FIGS. 1-5 and 7-9 show each only the side facing the viewer between the two screw connections 7. It is clear that a corresponding shape is also present on the side facing away from the viewer between the screw connections 7. In particular, surface contour 8 is mirror symmetrical in relation to a plane of symmetry, in which both screw connections 7 are located.

Surface contour 8 is specifically formed in the embodiment shown in FIG. 1 exclusively at flange 3 on a side facing the tube bell 2. Surface contour 8 is formed in the embodiment shown in FIG. 2 exclusively at the tube bell 2 on a side facing flange 3. Surface contour 8 is formed in the embodiment shown in FIG. 3 both at flange 3 on a side facing the tube bell 2 and at the tube bell 2 on a side facing flange 3. Surface contour 8 is formed in the embodiment shown in FIG. 4 exclusively at the other component 5 on a side facing the tube bell 2. Surface contour 8 is formed in the embodiment shown in FIG. 5 exclusively at the tube bell 2 on a side facing the other component 5. It is clear that other variants and combinations are also possible for arranging surface contour 8.

In all embodiments shown, surface contour 8 is preferably shaped such that flange 3 is elastically deformed when the screw connections 7 are tightened, i.e., when the flanged joint 1 is mounted, specifically such that the desired homogenization of the surface pressure between the screw sites 6, 7 becomes established as a result. While in case of a flat contour between the components to be screwed together, i.e., between flange 3 and the tube bell 2 as well as between the tube bell 2 and the other component 5 here, the screw connections 7 cause that an elastic deformation of the flange 3 that becomes established between the screw sites 6, 7 brings about a reduction of the surface pressure, the surface contour being proposed here between the screw sites 6, 7 generates an increase in the surface pressure between the screw sites 6, 7 during the mounting or tightening of the screw connections 7, which increase has such an extent that the reduction of the surface pressure between the screw sites 6, 7, which reduction results from the elastic deformation of flange 3, is more or less equalized.

Figure 5:
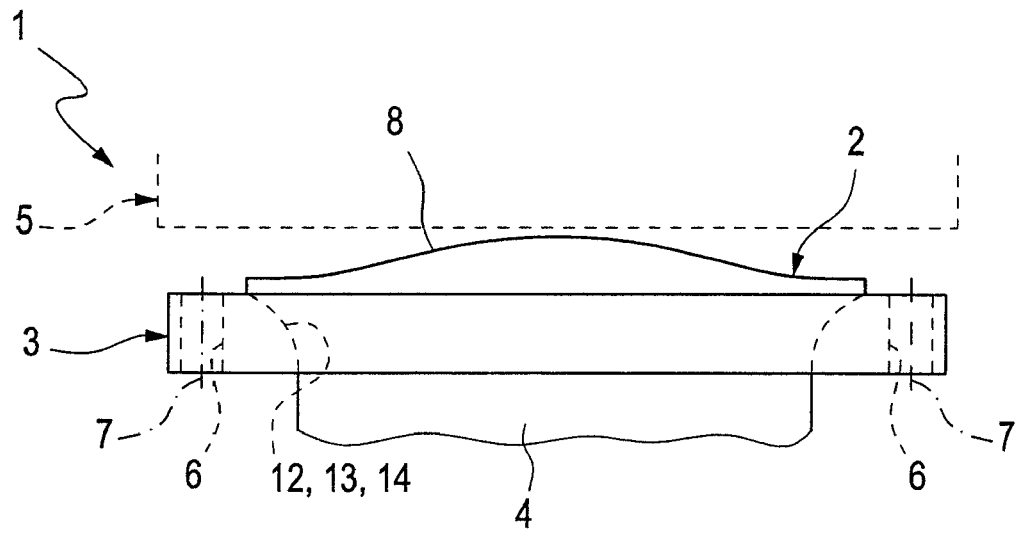
FIG. 5 is a greatly simplified side view of another embodiment of a flanged joint before mounting.
Figure 6:
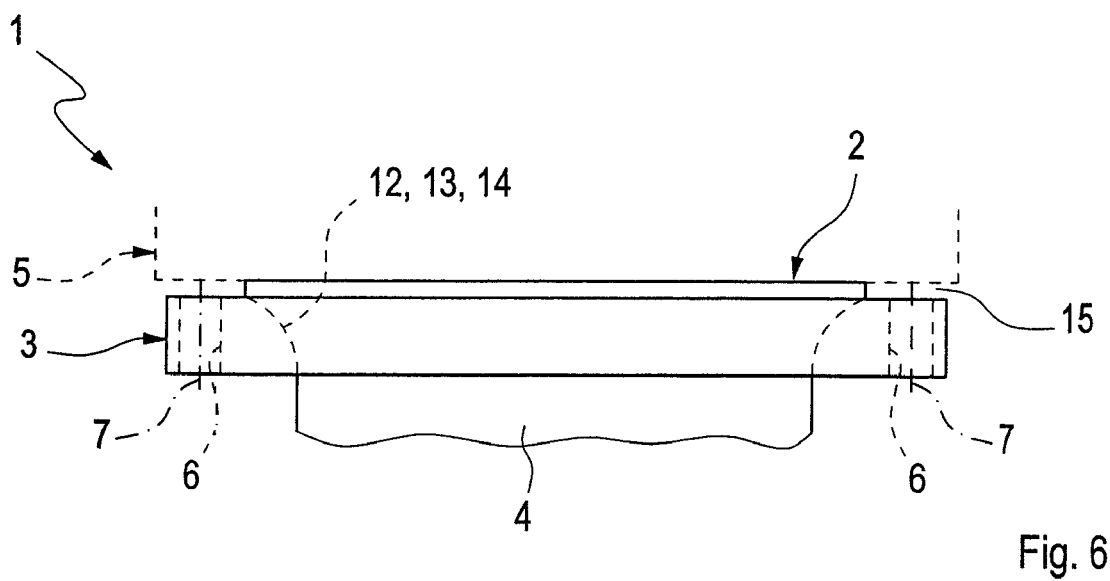
FIG. 6 is a side view as in FIGS. 1-5, but with the flanged joint mounted.

Surface contour 8 may be shaped, e.g., such that it bulges convexly between the screw sites 6, 7 in the variants according to FIGS. 1, 3, 5, 7 and 9 towards the tubular body 2, it arches convexly towards the other component 5 in the variant according to FIG. 5, and it arches convexly towards the flange 3 in the variant according to FIGS. 2, 3, 4, 8 and 9. The convex bulging of surface contour 8 is of a very uniform and "gentle" design. It is preferably mirror symmetrical in relation to a plane that extends centrally between the screw sites 7 and is at right angles to a plane in which the screw sites 7 are located. In particular, the bulging is shown greatly exaggerated or with a marked excessive elevation in FIGS. 1-5 and 7-9.

Figure 7:
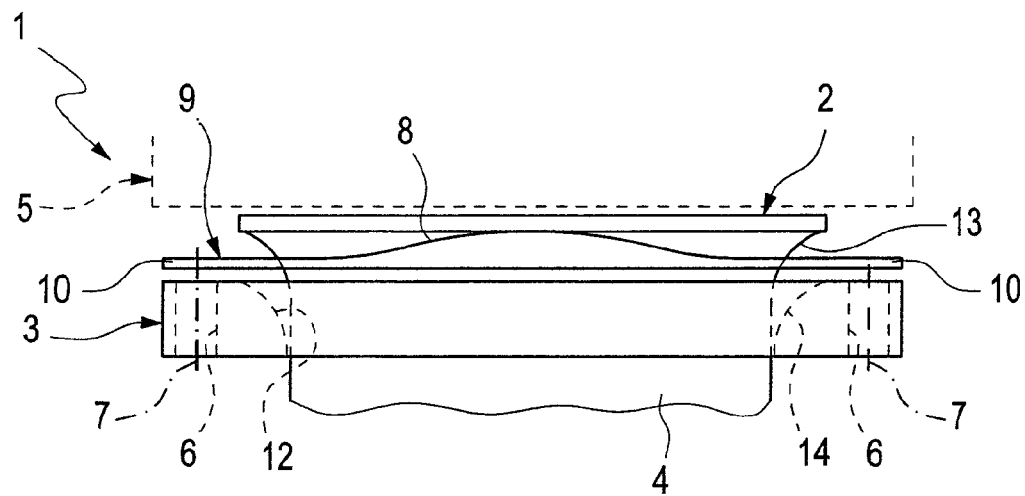
FIG. 7 is a side view of an embodiment of the flanged joint shown with an intermediate ring before mounting.
Figure 8:
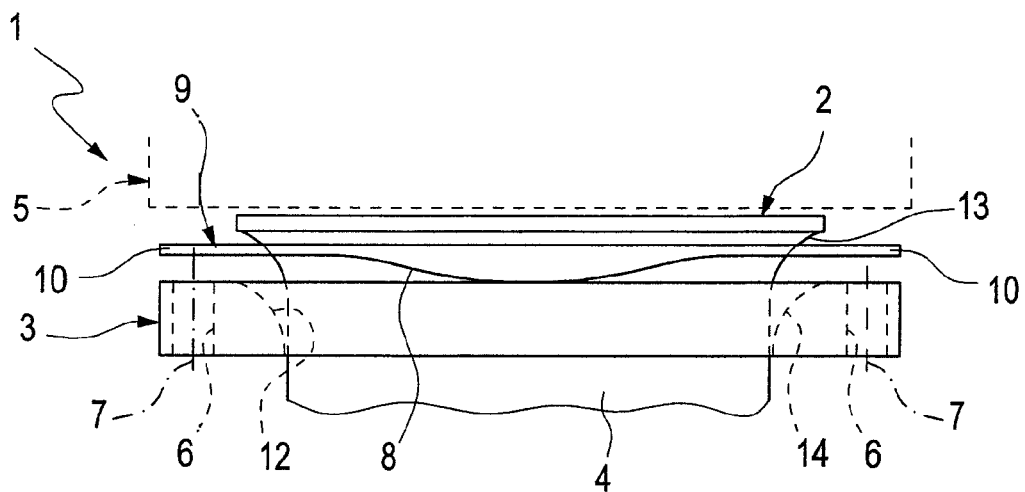
FIG. 8 is a side view of an embodiment of the flanged joint shown with an intermediate ring before mounting.
Figure 9:
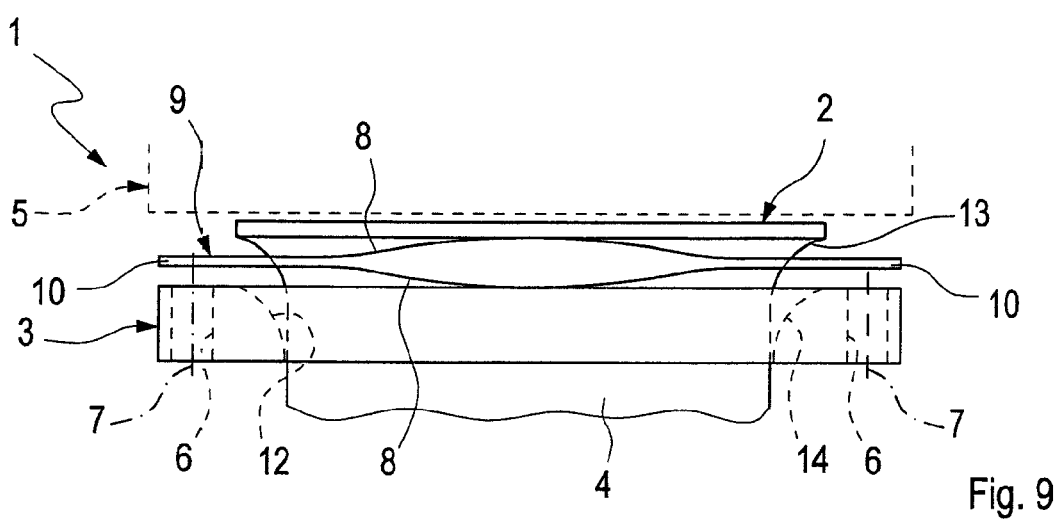
FIG. 9 is a side view of an embodiment of the flanged joint shown with an intermediate ring before mounting.
Figure 10:
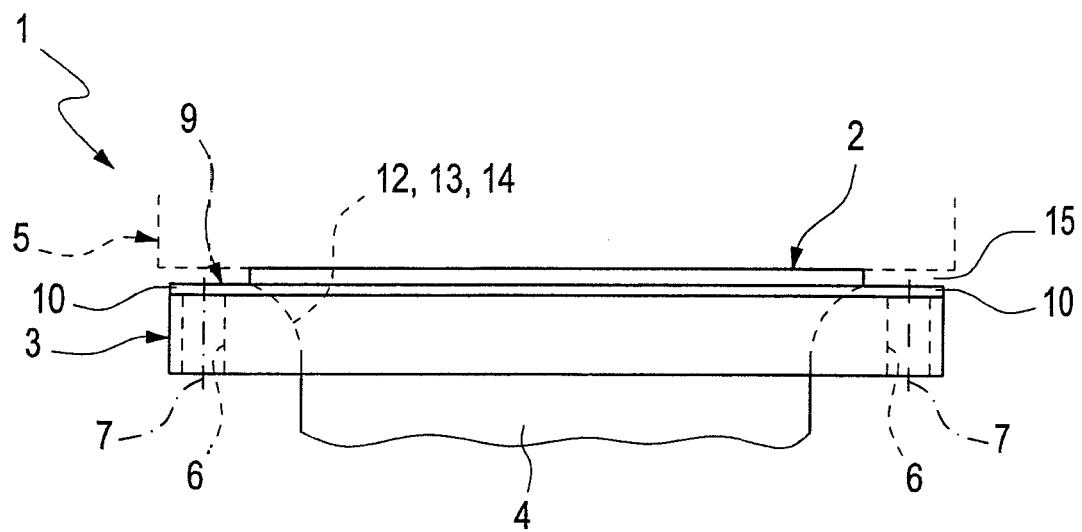
FIG. 10 is a view as in FIGS. 7-9, but with the flanged joint mounted.
Figure 11:
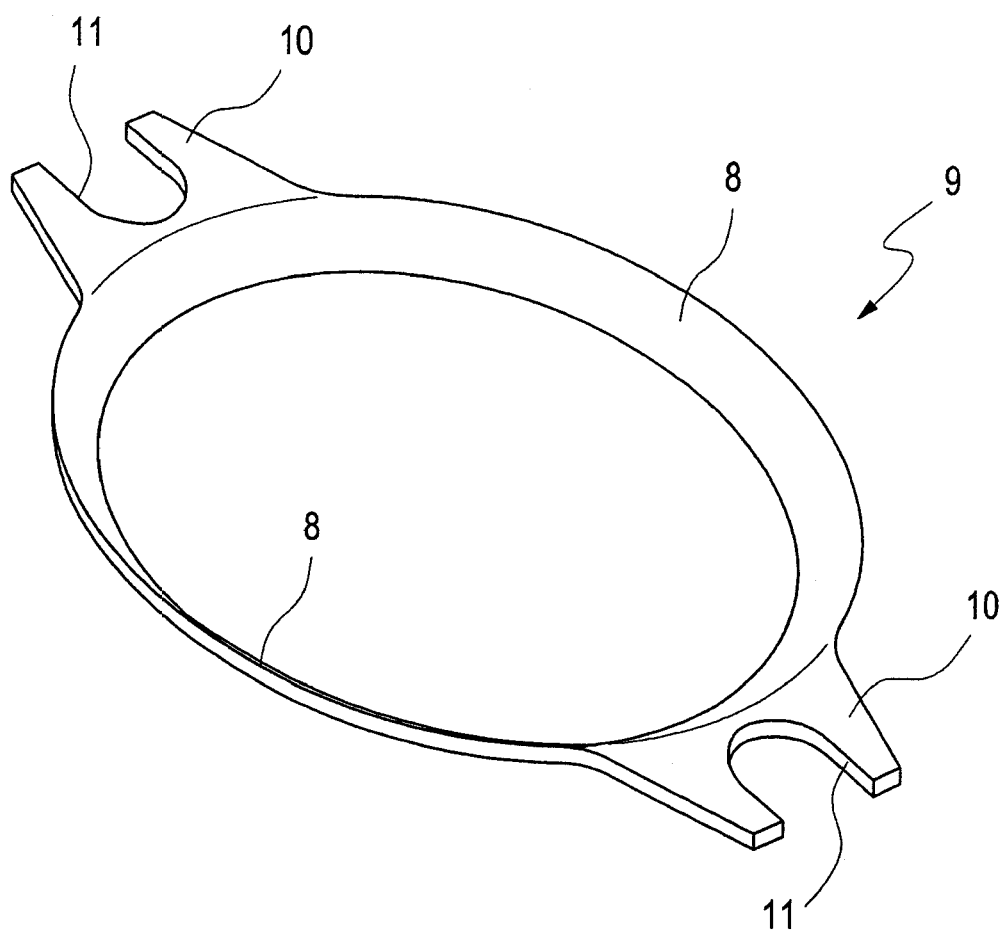
FIG. 11 is a perspective view of an intermediate ring.

While surface contour 8 is formed at least one of the components comprising flange 3, tube bell 2 and the other component 5 in the embodiments according to FIGS. 1-6, FIGS. 7-10 show embodiments in which surface contour 8 is formed at an intermediate ring 9. This intermediate ring 9 is arranged between tube bell 2 and flange 3. Flange 3 is correspondingly supported in the mounted state at the tube bell 2 via the intermediate ring 9. FIG. 7 shows an embodiment in which surface contour 8 is formed exclusively on a side of the intermediate ring 9 facing tube bell 2. FIG. 8 shows a variant in which surface contour 8 is formed exclusively on a side of the intermediate ring 9 facing flange 3. FIG. 9 shows an embodiment in which surface contour 8 is formed at the intermediate ring 9 both on a side facing tube bell 2 and on a side facing flange 3. It is clear that combinations of the embodiments according to FIGS. 7 through 10 with the embodiments according to FIGS. 1 through 6 are possible as well.

Corresponding to FIGS. 7-11, the intermediate ring 9 may have connecting sections 10, with which it can be integrated within the screw connections 7. These connecting sections 10 protrude, for example, into the areas of the passage openings 6 and may have corresponding recesses 11, so that the screw connections 7 can be passed through the passage openings 6 and through the recesses 11. Intermediate ring 9 may be designed and manufactured, for example, as a shaped sheet metal part. Recesses 11 are shown as examples only. The connecting sections 10 may also be of another suitable design.

Corresponding to FIGS. 1-10, the tube bell 2 may have a conical shape on the outside on the side facing flange 3. Complementarily to this, a passage opening 12 of flange 3, in which the tubular body 4 passes through the ring-shaped flange 3, may be of a conical shape as well. Tube bell 2 thus has an outer cone 13, while flange 3 has an inner cone 14 complementary thereto. To make it possible to better fit the intermediate ring 9 into this contact zone between flange 3 and tube bell 2, the intermediate ring 9 may also be conical corresponding to FIG. 11. To embody the desired surface contour 8, the intermediate ring 9 may have varying wall thickness in its circumferential direction. This wall thickness at first increases in the circumferential direction from one screw site 6, 7 to the next or other screw site 6, 7 and then decreases. The desired bulging can thus be generated to embody surface contour 8. Intermediate ring 9 is preferably provided with both an inner cone and an outer cone in its conical area.

While specific embodiments of the invention have been described in detail to illustrate the application of the principles of the invention, it will be understood that the invention may be embodied otherwise without departing from such principles.

What is claimed is:

1. A flanged joint of a motor vehicle exhaust system of an internal combustion engine, for fastening a tubular body of the exhaust system to another exhaust system component or internal combustion engine component, the flanged joint comprising:
    a tube bell formed at an end area of the tubular body;
    a ring-shaped flange surrounding the tubular body on a side of the tube bell facing away from the other component, the ring-shaped flange having a plurality of fastening sites for connection to the other component; and
    a surface contour between said flange and the other component, said surface contour extending axially further towards said flange or the another component in areas between said fastening sites than in areas at said fastening sites, said surface contour having a shape to provide a homogenization of surface pressure between fastening sites in the mounted state.

2. A flanged joint in accordance with claim 1, wherein said surface contour is one of formed and arranged between said flange and said tube bell, or between said tube bell and the other component.

3. A flanged joint in accordance with claim 1, wherein said shape of said surface contour is such that said flange is elastically deformed in the mounted state such that the homogenization of the surface pressure between the fastening sites is obtained.

4. A flanged joint in accordance with claim 1, wherein said surface contour between said fastening sites is bulged convexly towards one of said tube bell, said other component, and said flange.

5. A flanged joint in accordance with claim 1, wherein said surface contour is formed exclusively at said tube bell or exclusively at the other component or exclusively at said flange or at least at two members of the group comprising said tube bell, said flange and the other component.

6. A flanged joint in accordance with claim 1, further comprising an intermediate ring, wherein said surface contour is formed at said intermediate ring, said intermediate ring being arranged between said tube bell and said flange.

7. A flanged joint in accordance with claim 6, wherein said intermediate ring has connecting sections for integration of said intermediate ring within said fastening sites.

8. A flanged joint in accordance with claim 6, wherein said intermediate ring is a shaped sheet metal part.

9. A flanged joint in accordance with claim 6, wherein said intermediate ring is of a conical shape.

10. A flanged joint in accordance with claim 6, wherein said intermediate ring has a an axial wall thickness varying in the circumferential direction to embody said surface contour.

11. A flanged joint in accordance with claim 10, wherein the wall thickness of the intermediate first increases in the circumferential direction from one fastening site to an adjacent fastening site and then decreases again.

12. A flanged joint in accordance with claim 1, wherein said flange has exactly two diametrically opposite fastening sites.

13. A flanged joint in accordance with claim 1, wherein said flange has an inner cone on a side facing said tube bell.

14. A flanged joint in accordance with claim 1, wherein said fastening sites are each formed by a passage opening at said flange for a screw connection to the other component.

15. A flanged joint of a motor vehicle exhaust system of an internal combustion engine, for fastening a tubular body of the exhaust system to another exhaust system component or internal combustion engine component, the flanged joint comprising:
a tube bell formed at an end area of the tubular body;
a ring-shaped flange surrounding the tubular body on a side of the tube bell facing away from the other component, the ring-shaped flange having a plurality of fastening sites for connection to the other component; and
a surface contour between said flange and the other component, said surface contour having shape to provide a homogenization of surface pressure between fastening sites in the mounted state, said surface contour between said fastening sites being bulged convexly towards one of said tube bell, the other component and said flange.

16. A flanged joint comprising:
an exhaust system tubular body;
a tube bell formed at an end area of said tubular body;
another component adapted to be adjacent one side of said tubular body;
a ring-shaped flange surrounding said tubular body on another side of said tube bell diametrically opposite said another component, said ring-shaped flange having a plurality of fastening sites;
a plurality of fasteners, each of said plurality of fasteners arranged at one of said fastening sites and connecting said flange to said another component, each of said fasteners applying a force to a respective fastening site on said flange in a direction against said tube bell and said another component, a stiffness of said flange distributing said force along said flange to areas between said fastening sites, said stiffness diminishing a magnitude of said force with increasing distance from said fastening sites;
a surface contour between said flange and said another component, said surface contour having a shape to counteract the diminishing magnitude of the force caused by said stiffness with increasing distance from said fastening sites.

17. A flanged joint in accordance with claim 16, wherein said surface contour is one of formed and arranged between said flange and said tube bell, or between said tube bell and said other component.

18. A flanged joint in accordance with claim 16, wherein said surface contour is shaped such that said flange is elastically deformed such that the homogenization of the surface pressure between the fastening sites is obtained.

19. A flanged joint in accordance with claim 16, wherein said surface contour between said fastening sites is bulged convexly towards one of said tube bell, said another component, and said flange, said surface contour being formed exclusively at said tube bell or exclusively at said another component or exclusively at said flange or at least at two members of the group comprising said tube bell, said flange and said another component.

20. A flanged joint in accordance with claim 16, further comprising an intermediate ring, wherein said surface contour is formed at said intermediate ring, said intermediate ring being arranged between said tube bell and said flange.

* * * * *